3,712,853
DIAGNOSTIC AGENT FOR THE DETECTION OF NITRITE AND OF NITRITE-FORMING BACTERIA
Walter Rittersdorf, Hans-Georg Ray, and Peter Rieckmann, Mannheim-Waldhof, Germany, assignors to Boehringer Mannheim GmbH, Mannheim, Germany
No Drawing. Filed July 15, 1970, Ser. No. 55,246
Claims priority, application Germany, Aug. 14, 1969, P 19 41 370.8
Int. Cl. C12k 1/04
U.S. Cl. 195—103.5 R          18 Claims

ABSTRACT OF THE DISCLOSURE

Nitrites, e.g., nitrites formed by bacteria in body fluids, are detected even in very small concentrations, with a diagnostic test reagent comprising a diazotizable amine, a solid organic acid, and a coupling component of the formula

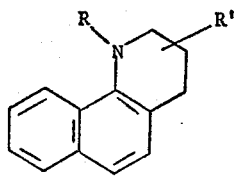

wherein R is hydrogen or alkyl, preferably lower alkyl, and R' is hydrogen, hydroxyl or alkyl, preferably lower alkyl, or acyloxy, preferably lower acyloxy.

---

The present invention is concerned with a new and improved diagnostic agent for the detection of nitrite and of nitrite-forming bacteria in body fluids, especially in urine.

Bacterial infections of the kidneys and of the urinary tract result in very serious damage to the health if they are not recognized in good time and suitably treated. By detecting bacteria which are excreted in the urine, such an infection can also be recognized in its early stages. The detection, which is scientifically exact, is effected by incubation of the bacteria-containing urine on a suitable nutrient medium and subsequent counting of the bacterial growth. However, this method is too time-consuming for medical practice and is also too laborious so that it is completely unsuited for a rapid test.

Most of the bacteria which are present in the case of infections of the urinary tract reduce the nitrate present in the bladder into nitrite. A known and sensitive method for the detection of bacteria in the urinary tract depends upon the determination of the amount of nitrite in the excreted urine by means of the Griess test. The urine is mixed with an acidic solution of sulfanilic acid and α-naphthylamine; nitrite present in the urine diazotizes the sulfanilic acid and the diazonium salt produced couples with the α-naphthylamine to give a red azo dyestuff, the concentration of which corresponds to the concentration of the nitrite.

Although this test is sufficiently sensitive for the detection of the often very small amounts of nitrite which occur in the case of infections of the urinary tract and can also be carried out quickly and simply enough for medical practice, it suffers from the great disadvantage that the reagent solutions used are not stable. Therefore, these solutions must be freshly prepared before each test, and require trained personnel and laboratory facilities.

Many attempts have been described for carrying out the Griess test on absorbent carriers in order to avoid the unpleasant working with strongly acidic solutions. A reagent mixture of sulfanilic acid, α-naphthylamine and a solid organic acid is, in a dry state, much more stable on an absorbent carrier than in solution so the diagnostic agents of this type can be stored for quite a long time without losing their sensitivity. Examples of such diagnostic agents are the test papers proposed by Fischl and Pinto (Clin. Chim. Acta, 2, 527–533/1957) which are impregnated with a mixture of sulfanilic acid, α-naphthylamine and citric acid. Furthermore, in U.S. patent specification No. 3,415,717, there are described test papers which are impregnated with a mixture of a diazotizable amine, N,N-dialkyl-α-naphthylamine and a solid organic acid.

Test papers prepared according to these teachings have a lowermost detection limit of 0.1–1 mg. percent sodium nitrite. Since the nitrite formed by the bacteria arises solely by the reduction of nitrate, which is only ingested with food in trace amounts, the traces of nitrite which have to be detected in the case of a bacterial infection are frequently below this limit of detection. It would, therefore, be desirable to have stable test papers which have a substantially greater degree of sensitivity.

We have now, surprisingly, found that stable test papers can be produced, which function according to the principle of the Griess test and also indicate with certainty traces of nitrite of the order of 0.02 mg. percent, when, as a coupling component, there is used a 1,2,3,4-tetrahydrobenzo(h)quinoline compound of the general formula:

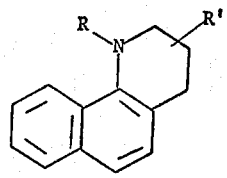

wherein R is hydrogen or alkyl, preferably lower alkyl, and R' is hydrogen, hydroxyl or alkyl, preferably lower alkyl, or acyloxy, preferably lower acyloxy.

Accordingly, this invention provides a novel technique for determining nitrite, and novel test reagents comprising such a coupling component, a diazotizable amine, and a solid acid.

As the diazotizable amine, there can be used, for example, sulfanilic acid, arsanilic acid or p-aminobenzoic acid, sulfanilamide being preferred.

As the solid acid, there can be used citric acid or malic acid or, preferably, oxalic acid or tartaric acid.

The various components are preferably dissolved in an alcohol and paper or some other absorbent carrier is then impregnated with the solution and thereafter dried.

The coupling component and the diazotizable amine can be used in amounts of from 0.2 to about 20 mmole/100 ml. of impregnation solution, preferably in amounts of from 1–2 mmole/100 ml. impregnation solution.

From a practical point of view, the ratio of coupling component to diazo component is about 1:1 but can also be from about 2:1 to about 1:5. The acid is preferably added to the impregnation solution in a concentration of 1–10 grams/100 ml.

The test papers according to the present invention can, of course, be used not only for the detection of nitrite-forming bacteria in urine but also quite generally for the detection of nitrite and of nitrite-forming bacteria, for example, in drinking water or in foodstuffs.

Thus, the diagnostic agent according to the present invention comprises a diazotizable amine, a coupling component of the above-given general formula and a solid organic acid, preferably on an absorbent carrier.

The following examples are given for the purpose of illustrating the present invention, but are not to be construed as limitative thereof.

EXAMPLE 1

Filter paper (Schleicher & Schüll No. 2316) was impregnated with the following solution:

| | Grams |
|---|---|
| Sulfamilamide | 0.2 |
| 3-hydroxy - 1,2,3,4 - tetrahydrobenzo(h)quinoline | 0.17 |
| Tartaric acid | 2.5 |
| Methanol, to 100.0 ml. (of solution). | | and thereafter dried.

The test paper thus obtained reacted with nitrite-containing urine with the formation of a pink to red-violet color, the lowermost detection limit being 0.01–0.02 mg. percent nitrite.

EXAMPLE 2

Filter papers (Schleicher & Schüll No. 2316) were impregnated with solutions of 1 millimole 3-hydroxy-1,2,3,4-tetrahydro-benzo(h)quinoline, 2 millimoles of one of the diazo components set forth in the following Table I and 1.5 grams oxalic acid in 100 ml. methanol and then dried. The colors produced by these papers when contacted with nitrite-containing urine are also set out in the following Table I.

TABLE I

| Diazo component | Color with nitrite-containing urine |
|---|---|
| Sulfanilic acid | Pink-pink violet. |
| Arsanilic acid | Pink-purple. |
| p-Aminobenzoic acid | Bluish pink-blue violet. |

The lowermost detection limit for nitrite by means of these test papers was between 0.01 and 0.02 mg. percent nitrite.

EXAMPLE 3

Filter papers (Schleicher & Schüll No. 2316) were impregnated with solutions of 2 millimoles of sulfanilamide, 2 millimoles of one of the coupling components set out in the following Table II and 2.5 grams tartaric acid in 100 ml. methanol and then dried. The colors produced by these papers when contacted with nitrite-containing urine are also set out in the following Table II.

TABLE II

| Coupling component | Color with nitrite-containing urine |
|---|---|
| 1,2,3,4-tetrahydrobenzo(h)quinoline | Pink-carmine. |
| 1,2,3,4-tetrahydro-benzo(h)quinaldine | Do. |
| 3-hydroxy-N-methyl-1,2,3,4-tetrahydro-benzo(h)-quinoline. | Pink-purple red. |
| 3-acetoxy-N-methyl-1,2,3,4-tetrahydro-benzo(h)-quinoline. | Do. |
| N-methyl-1,2,3,4-tetrahydro-benzo(h)quinoline | Pink-red. |

The lowermost detection limit for nitrite by means of these test papers was between 0.01 and 0.03 mg. percent nitrite.

What is claimed is:

1. Diagnostic agent for the detection of nitrite which agent comprises a diazotizable amine, a solid organic acid, and a coupling component capable of coupling with diazonium salts, said coupling agent being a 1,2,3,4-tetrahydrobenzo(h)quinoline compound of the general formula:

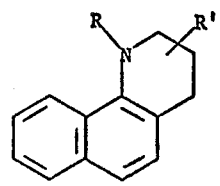

wherein R is hydrogen or alkyl, and R' is hydrogen, hydroxyl or alkyl, or acyloxy.

2. Diagnostic agent as claimed in claim 1 wherein the components of said agent are deposited on an absorbent carrier.

3. Diagnostic agent as claimed in claim 1 wherein said coupling component is a 1,2,3,4-tetrahydrobenzo(h)quinoline compound selected from the group consisting of
1,2,3,4-tetrahydro-benzo(h)-quinoline,
1,2,3,4-tetrahydro-benzo(h)quinaldine,
3-hydroxy-1,2,3,4-tetrahydro-benzo(h)quinoline,
3-hydroxy-N-methyl-1,2,3,4-tetrahydro-benzo(h)quinoline,
3-acetoxy-N-methyl-1,2,3,4-tetrahydro-benzo(h)quinoline and
N-methyl-1,2,3,4-tetrahydro-benzo(h)quinoline.

4. Diagnostic agent as claimed in claim 1 wherein the diazotizable amine is selected from the group consisting of sulfanilamide, sulfanilic acid, arsanilic acid and p-aminobenzoic acid.

5. Diagnostic agent as claimed in claim 1 wherein said solid organic acid is selected from the group consisting of oxalic acid, tartaric acid, citric acid and malic acid.

6. Diagnostic agent as claimed in claim 1 wherein the weight ratio of coupling component to diazotizable amine component is about 2:1 to about 1:5.

7. Diagnostic agent as claimed in claim 6 wherein the said ratio is about 1:1.

8. Diagnostic agent as claimed in claim 2 wherein said absorbent carrier is filter paper.

9. Diagnostic agent as claimed in claim 1 for use in the detection of nitrite forming bacteria.

10. Process for the production of a diagnostic agent as claimed in claim 1, wherein an absorbent carrier is impregnated with a solution in a lower alcohol of a diazotizable amine, a coupling component of the general formula given in claim 1 and a solid organic acid and then dried.

11. Process as claimed in claim 10, wherein the coupling component and the diazotizable amine are used in a concentration of 0.2–20 millimoles/100 ml. of impregnation solution.

12. Process as claimed in claim 11, wherein the coupling component and the diazotizable amine are used in a concentration of 1–2 millimoles/100 ml. of impregnation solution.

13. Process as claimed in claim 10, wherein the solid organic acid is used in a concentration of 1–10 grams/100 ml. of impregnation solution.

14. Process as claimed in claim 10 wherein the absorbent carrier is filter paper.

15. Process as claimed in claim 10 wherein the lower alcohol is methanol.

16. Method for detecting nitrite which comprises contacting the nitrite-containing materials with the diagnostic agent as claimed in claim 1, and observing the color produced as an indication of the presence of nitrite.

17. Method for the detection of nitrite-forming bacteria which comprises contacting the material containing nitrite forming bacteria with the diagnostic agent as claimed in claim 1 and observing the color produced as an indication of the presence of nitrite-forming bacteria.

18. Method for detecting nitrite-forming bacteria in body fluids which comprises admixing with a sample of said body fluid a diagnostic agent as claimed in claim 1 and observing the color produced as an indication of the presence of nitrite-forming bacteria.

References Cited

UNITED STATES PATENTS

| | | | |
|---|---|---|---|
| 3,415,717 | 12/1968 | Avakian | 195—103.5 R |
| 2,149,051 | 2/1939 | Helberger et al. | 260—155 X |
| 2,773,054 | 12/1956 | Straley et al. | 260—155 |
| 2,067,725 | 1/1937 | Ohlendorf et al. | 260—155 |
| 2,136,300 | 11/1938 | Helberger et al. | 260—155 |
| 3,547,780 | 12/1970 | Finnerty et al. | 195—103.5 R |

OTHER REFERENCES

Chemical Abstracts, 62:9270g (1965).

A. LOUIS MONACELL, Primary Examiner

M. D. HENSLEY, Assistant Examiner

U.S. Cl. X.R.

23—253 TP